Nov. 18, 1952 W. STELZER 2,618,123
HYDRAULIC BOOSTER BRAKE SYSTEM
Filed Jan. 8, 1951 2 SHEETS—SHEET 1
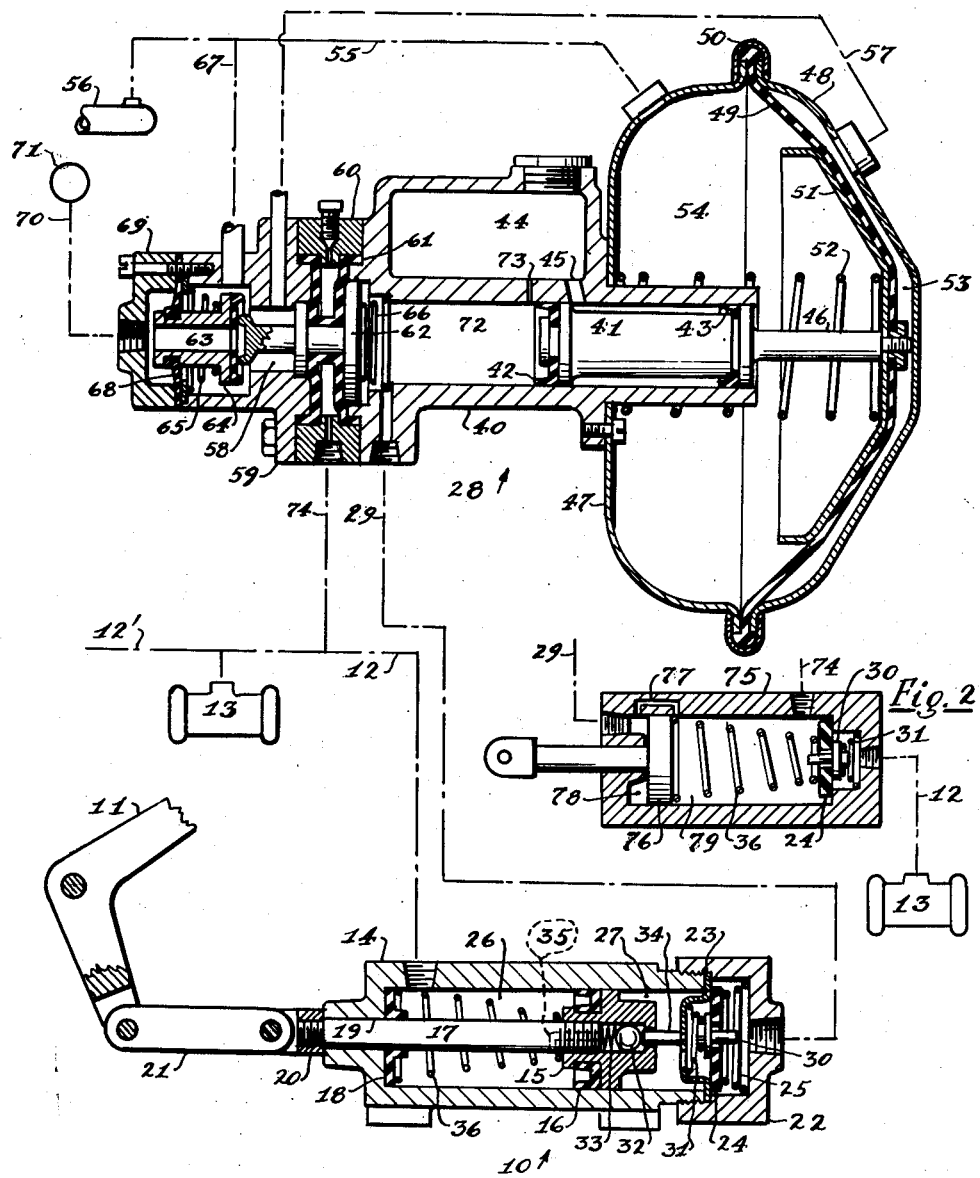
INVENTOR.
William Stelzer Nov. 18, 1952     W. STELZER     2,618,123
HYDRAULIC BOOSTER BRAKE SYSTEM
Filed Jan. 8, 1951     2 SHEETS—SHEET 2
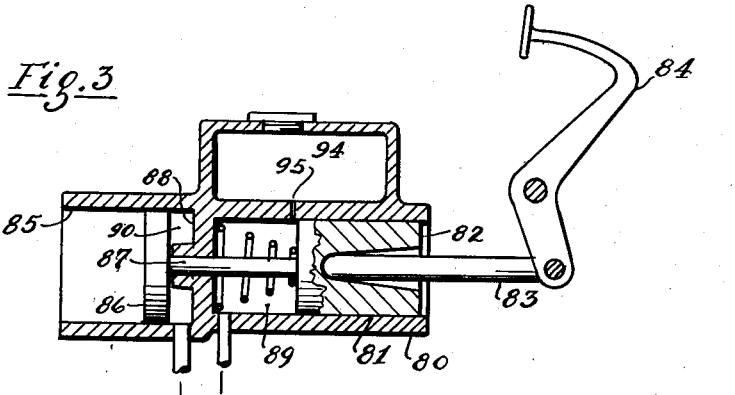
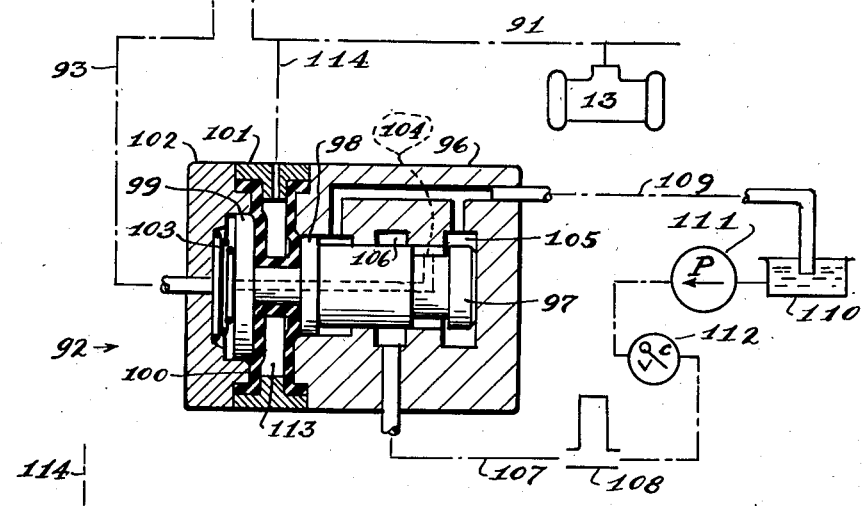
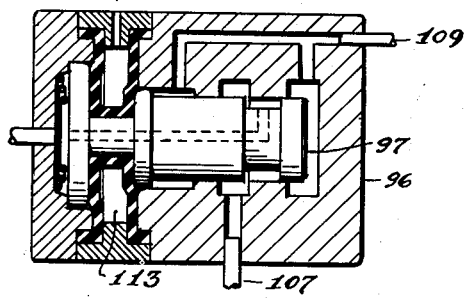
INVENTOR.
William Stelzer Patented Nov. 18, 1952

2,618,123

UNITED STATES PATENT OFFICE 2,618,123

HYDRAULIC BOOSTER BRAKE SYSTEM

William Stelzer, Summit, N. J.

Application January 8, 1951, Serial No. 204,946

4 Claims. (Cl. 60—54.5)

The invention relates to a hydraulic booster brake system, and more particularly to a booster system for hydraulic brakes of automatic vehicles, where the brakes are operated by manual power augmented by the force of a power operated booster controlled in a manner which characterizes this invention.

It is customary in the art to call the manually operated hydraulic pressure producing element the master cylinder, and the power operated mechanism assisting the manually operated element the booster. This terminology is maintained herein though the functions of these elements are different from present systems. The usual practice is to produce a primary hydraulic pressure with the master cylinder and to transmit it to the booster which then transmits an increased pressure to the wheel cylinders to apply the brakes. The effort of the booster is in response to the primary pressure received from the master cylinder. According to the new invention the master cylinder transmits fluid directly to the wheel cylinders, and the booster acts indirectly on the master cylinder to ease the manual effort. The reaction for controlling the booster is between the hydraulic pressure produced by the booster and the wheel cylinder pressure, or the boosted pressure. It is thus entirely divorced from the manual effort. By maintaining a predetermined ratio between booster effort and boosted pressure, the latter is automatically in a fixed relation with the manual effort.

The advantages gained with the new construction are a considerable simplification of the control mechanism and the opportunity to place the fluid reservoir with the booster unit so that the size of the master cylinder may be greatly reduced and it may be mounted in any position.

One of the objects of the invention is to eliminate the usual hydraulic trip valve from the booster and to provide a trip valve in the master cylinder to allow return of fluid from the wheel cylinders to the booster when the master cylinder is in the released position.

Another object is to place a residual pressure valve in the master cylinder in an arrangement where the control mechanism of the booster is not subject to the residual pressure in the wheel cylinders.

A further object is to provide a control valve mechanism for the booster that is operated by the initial movement of the master cylinder; i. e., the initial movement of the master cylinder may be used solely to operate the valve without actuating the wheel cylinders before the booster is energized.

Other advantages and objects of this invention will be apparent from the following description considered in connection with the accompanying drawings submitted for the purpose of illustration and not to define the scope of the invention, reference being had for that purpose to the subjoined claims. In the drawings, wherein similar reference characters refer to similar parts throughout the several views:

Fig. 1 is a longitudinal cross-sectional view of the booster and master cylinder, the connections and the other elements completing the entire system being shown diagrammatically;

Fig. 2, a diagrammatic sectional view of a modified master cylinder for the same system;

Fig. 3, a diagram showing a modified form of the invention, the master cylinder and valve mechanism being shown in section; and Fig. 4, a section through the valve mechanism of Fig. 3 showing a different position assumed in operation.

Before explaining the present invention in detail, it is to be understood that the invention is not limited in its application to the details of construction and arrangement of elements illustrated in the accompanying drawings, since the invention is capable of other embodiments and of being practised or carried out in different ways. Also it is to be understood that the phraseology or terminology employed herein is for the purpose of description and not limitation.

Referring to Fig. 1, master cylinder 10 is operated by manual power through foot pedal 11 to transmit fluid through line 12 to wheel cylinders 13 of which only one is shown, line 12' leading to the others. The master cylinder comprises a cylinder 14 in which slides a piston 15 provided with a seal 16 and secured to a piston rod 17 passing through seal 18 and bearing 19 to be connected with pedal 11 by means of a clevis 20 and link 21. The end of cylinder 14 is closed by a cap 22 retaining a perforated metal cup 23 serving as a gasket for the cap and as a seat for the residual pressure valve 24 held in a closed position by a spring 25 to maintain a residual or higher pressure in wheel cylinders 13 and in chambers 26 and 27 of the master cylinder. Fluid is permitted to flow from the booster unit 28 and line 29 through a check valve 30, seated by a very light spring 31, into chamber 27. A trip valve 32 is provided within piston 15 and urged into a closed position by a light spring 33. A pin 34 fastened to cup 23 serves to open valve 32 in the released position as shown, so that valve ball 32 is lifted from its seat and fluid may pass between chambers 26 and 27 through passage 35. The master cylinder piston is shown in the released or starting position into which position it is urged by return spring 36.

The booster unit 23 comprises a cylinder body 40 in whose bore slides a piston 41 having a primary seal 42 and a secondary seal 43, the latter sealing the fluid from reservoir 44 communicating with the space between the two seals through hole 45. Piston 41 has a piston rod 46 to be operated by a booster motor comprised of a casing 47 secured to cylinder body 40, a cover 48, a diaphragm 49 clamped between 47 and 48 by means of a clamp ring 50, and a diaphragm plate 51 secured to piston rod 46. A return spring 52 urges the booster piston and the diaphragm piston of the motor into the released or starting position, as shown. Diaphragm 49 divides the space within casing 47 and cover 48 into chambers 53 and 54, the latter being permanently connected through line 55 to a source of low pressure or vacuum 56. Chamber 53 is connected through line 57 to chamber 58 of valve body 59 clamped to cylinder 40 with a ring or spacer 60 and double diaphragm 61 interposed. The central portion of the latter is mounted on a double or differential piston 62 whose extension at the left serves as a valve to close off the central passage 63 of a rubber faced vacuum or low pressure valve 64 urged into a seated position by a spring 65 subordinate to a stronger spring 66 urging piston 62 to the left to keep vacuum valve 64 open as shown. The chamber in which spring 65 is housed is in communication with the source of vacuum by means of line 67. This chamber is sealed against the atmosphere or against the source of air pressure by a diaphragm 68 serving also to balance the valve to reduce the effort required to operate the valve when the motor mechanism is to be energized. The outer portion of diaphragm 68 is secured to valve body 59 by means of cap 69 having a connection 70 leading to the atmosphere or to a source of air pressure 71. Chamber 72 of the booster cylinder is connected to line 29 leading to the master cylinder and it is also in communication with reservoir 44 through port 73 when the latter is uncovered in the released or starting position, as shown. The space inside of seal 61 is connected through line 74 to wheel cylinder line 12 and to chamber 26 of the master cylinder where the final pressure is produced.

The modified master cylinder in Fig. 2 comprises a cylinder body 75 in which slides a piston 76 whose piston rod passes through the end wall at the left. A by-pass 77 serves to establish communication between chamber 78 and 79 when the master cylinder is in the released or starting position. Line 74 from the booster leads directly into chamber 79 so that the residual pressure maintained by residual valve 24 is not transmitted to seal 61 of the booster, thus permitting spring 66 to be weaker so that the booster may start to operate at a lower master cylinder pressure.

The modified construction illustrated in Fig. 3 uses a master cylinder 80 having a bore 81 in which slides a piston 82 engaged by a push rod 83 actuated by a foot pedal 84. Since the illustration is diagrammatic, the seals have been omitted. In another concentric bore 85 slides a helper piston 86 connected to piston 82 by a piston rod 87 passing through wall 88 separating the two bores and forming expansible chambers 89 and 90 connected to wheel cylinders 13 through line 91 and to a valve unit 92 through line 93, respectively. A fluid reservoir 94 is an integral part of the master cylinder, in communication with chamber 89 through port 95 when the master cylinder is in the released position, as shown.

The valve unit 92 comprises a body 96 having a central bore in which slides a valve plunger 97 with pistons 98 and 99 at the left end engaging a double diaphragm 100 whose outer flanges are secured by a recessed ring 101 bolted or otherwise fastened between valve body 96 and a cover 102, the latter having a central bore to slidingly receive piston 99 and to house are turn spring 103 urging the valve plunger into the released position as shown. The valve plunger has a peripheral groove in comunication with line 93 through passage 104. Valve 96 is provided with internal grooves 105 and 106, the latter being connected through line 107 with an accumulator or other source of fluid pressure 108. Groove 105 is connected to low pressure line 109 leading to sump or reservoir 110 to feed make-up pump 111 connected to accumulator 108 through check valve 112. These pressure producing elements are indicated diagrammatically only since their construction is well known, this type of pressure system having been used extensively in aircraft. The stepped bore of the valve body in which piston 98 slides is also in communication with low pressure line 109 and groove 105 to prevent any possible pressure build-up against diaphrgam 100. Chamber 113 within the latter is open to the hydraulic pressure produced in chamber 89 of the master cylinder through lines 91 and 114. While in this embodiment the fluid medium from the pressure source is considered as a liquid, it is apparent that the principle is not changed if a compressible fluid is used.

Considering now the operation of the embodiment shown in Fig. 1, and assuming the system to be in the starting position as shown, depression of the foot pedal by the operator causes piston 15 of the master cylinder to be moved toward the left to displace fluid from chamber 26 to the chamber within diaphragm 61, acting on the two differential pistons in opposite directions. Since the force on the large area is greater, piston 62 is moved toward the right to compress spring 66 and to allow vacuum valve 64 to close. When this valve is closed, chamber 53 of the motor mechanism is shut off from the source of vacuum or low pressure. Further movement of piston 62 toward the right under increased pressure from chamber 26 unseats the atmosphere valve which is part of piston 62, and thus opens up a passage from source of pressure 71 into chamber 58 and through line 57 to chamber 53 of the motor mechanism so that the latter is energized to push piston 41 toward the left, displacing fluid from chamber 72 into chamber 27 to assist in the application of the master cylinder. The increased pressure in chamber 72 acting on piston 62 opposes the action of the hydraulic fluid within diaphragm 61 so that when the pressure in chamber 72 is increased to be in a pre-determined proportion to the final or wheel cylinder pressure the air valve is closed again to prevent any further energization of the motor mechanism. The proportion between the hydraulic pressure generated by the booster and the hydraulic pressure produced by the master cylinder is dependent on the proportion of differential piston 62. According to the example shown the valve would be balanced, i. e., in a lap position, if the hydraulic pressure in chamber 72 is approximately two thirds of the hydraulic pressure produced by the master cylinder. This may be best illustrated with figures. Assuming the cross sectional area of the large piston of 62 to be ¾ square inch, and that of the small piston ¼ square inch, then the effective area exposed to the hydraulic pressure from line 74 is ½ square inch. If the pressure in line 74 is 1000 p. s. i., the force is 500 lbs., urging piston 62 towards the right. Opposing this force is a hydraulic pressure of 666 p. s. i. in chamber 72 acting on an area of ¾ square inch, producing a force of 500 lbs. Neglecting the action of the valve springs, the valves would then be balanced so that the power of the motor would not be further increased. Since the manual effort is equal to the difference between the final or combined effort and the booster effort, the manual effort or work in this case is one third of the final effort represented by the hydraulic pressure in the wheel cylinders, so that the booster ratio is 3:1. It will also be remembered that this is the ratio of the areas of differential piston 62, whereby the small area represents the manual effort on the brake pedal and the large area the effort exerted to actuate the wheel cylinders. In this consideration the effect of piston rod 17 of the master cylinder has been neglected. Due to the smaller volume displaced from chamber 26 in relation to the volume received in chamber 27 the final pressure is somewhat higher. Assuming now that the operator releases the brake pedal, the hydraulic pressure in chamber 26 is reduced by one third so that the hydraulic pressure in chamber 72 is able to push piston 62 towards the left to close the air valve and open vacuum valve 64 so that chamber 53 is open to vacuum or low pressure again. The master cylinder as well as the booster therefore immediately start their retractile movement to return to the original or released position, where valve 32 is forced open and piston seal 42 of the booster passes port 73 so that communication is established between reservoir 44 and wheel cylinders 13, with residual valve 24 maintaining a slightly higher pressure in the wheel cylinders than exists in reservoir 44. If a brake application is made during power failure, then the booster motor remains in the released position while the brakes are applied purely by manual power. In this operation fluid is drawn into chamber 27 from reservoir 44 via port 73 and past cup 42 and piston 41, the latter having the necessary clearance to allow this bypass, as is now the practice in present day master cylinders. During the retractile movement of piston 15 when the brake pedal is released again, the fluid from chamber 27 has to be pushed back into reservoir 44 through port 73. It may be noted that piston 15 of the master cylinder will always be permitted to return to the released position, allowing fluid to pass from chamber 27 into chamber 26 either past valve 32 or past the outer lip of seal 16 whenever the hydraulic pressure in chamber 26 is lower. The operation of the master cylinder, shown in Fig. 2, is similar to that described in Fig. 1. Piston 76 is pushed toward the right when the brakes are to be applied. The difference is mainly that in this construction the residual pressure in wheel cylinders 13 and line 12 is not transmitted to the chamber within seal 61. By-pass 77 in principle is the same as valve 32.

In the operation of the modified structure in Figs. 3 and 4, depression of the brake pedal causes piston 82 to move toward the left, closing port 95 and displacing hydraulic fluid from chamber 89 into chamber 113 of the valve unit to move valve plunger 97 toward the left so that the groove in the latter becomes disconnected from valve groove 105 and then comes into communication with groove 106 to allow fluid under pressure from source 108 through passage 104 into chamber 90, thus assisting in the application of the master cylinder and thereby increasing the hydraulic pressure in chamber 89. This position of the valve is illustrated in Fig. 4. Though the pressure in source 108 may be very high, and more or less constant, the action of the valve unit is such as to produce a pressure in chamber 90 that is in a predetermined proportion with the hydraulic pressure transmitted to the wheel cylinders. As soon as pressure is transmitted from source 108 to chamber 90, the pressure reacts against piston 99 of the valve plunger in opposition to the pressure in chamber 113 to return valve plunger 97 to a lap position as soon as the booster pressure in chamber 90 is sufficiently high. Release of the brake pedal with a consequent reduction in hydraulic pressure in chambers 89 and 113 causes plunger 97 to be moved towards the right by virtue of the hydraulic pressure acting on piston 99 in the chamber which houses spring 103. Plunger 97 accordingly assumes the released position again where the source of pressure is disconnected and where chamber 90 is open to low pressure or sump 110 through passage 104 and internal groove 105. Pistons 99 and 98 constitute differential pistons as described in Fig. 1, and the explanations in regard to booster ratio apply in principle also to this construction. A further way of changing the booster ratio is in the size of piston 86. It is obvious that by increasing the diameter of piston 86 and bore 85 the booster ratio is increased and the manual effort reduced.

I claim:

1. In mechanism of the class described, a liquid pressure system including a manually operated master cylinder connected to transmit hydraulic fluid to wheel cylinders to apply the brakes, a booster comprising a hydraulic pressure producing device arranged and connected to transmit hydraulic fluid to said master cylinder to assist the manual actuation of said master cylinder, a motor operatively connected with said pressure producing device, a source of power to energize said motor, valve means to transmit power from said source of power to said motor, pressure sensitive means responsive to the hydraulic pressure produced in said master cylinder through the combined manual and power effort to operate said valve means to increase the power of said motor, means responsive to the hydraulic pressure produced by said pressure producing device to urge said valve means to reduce the power of said motor mechanism, and means to maintain a residual pressure in said wheel cylinders.

2. The construction in claim 1, wherein said means to maintain a residual pressure in said wheel cylinders is arranged intermediate said wheel cylinders and said master cylinder so that the residual pressure is limited to the wheel cylinders and is not imposed on said pressure sensitive means.

3. In mechanism of the class described, a manually operable master cylinder adapted to transmit hydraulic fluid under pressure to wheel cylinders to apply the brakes, a hydraulic booster adapted to produce a hydraulic pressure and to transmit it to said master cylinder to assist in the operation of the latter, a motor arranged to operate said booster, a source of fluid pressure to energize said motor, a valve for controlling communication of fluid from said source to said motor, and a differential diaphragm responsive to the hydraulic pressure transmitted to said wheel cylinders and operatively connected to urge said valve to increase the power of said motor, said differential diaphragm being acted upon in an opposing direction by the hydraulic pressure produced by said booster to urge said valve to reduce the power of said motor.

4. The construction as claimed in claim 3, a fluid reservoir connected with said booster, and a passage from said reservoir arranged to be uncovered in the released position to establish communication with the fluid transmitted from said booster to said master cylinder.

WILLIAM STELZER.

REFERENCES CITED

The following references are of record in the file of this patent:

UNITED STATES PATENTS

| Number | Name | Date |
|---|---|---|
| Re. 22,348 | Stelzer | July 13, 1943 |
| Re. 22,349 | Stelzer | July 13, 1943 |
| 1,903,973 | Boughton | Apr. 18, 1933 |
| 1,921,590 | Staude | Aug. 8, 1933 |
| 1,997,062 | Huffman | Apr. 9, 1935 |
| 2,057,707 | Carroll | Oct. 20, 1936 |
| 2,136,318 | Rossmann | Nov. 8, 1938 |
| 2,275,697 | Stelzer | Mar. 10, 1942 |
| 2,328,684 | Schnell | Sept. 7, 1943 |
| 2,343,698 | Parnell | Mar. 7, 1944 |
| 2,352,357 | Almond | June 27, 1944 |
| 2,353,755 | Price | July 19, 1944 |
| 2,373,272 | Stelzer | Apr. 10, 1945 |
| 2,383,682 | Price | Aug. 28, 1945 |
| 2,398,165 | Stelzer | Apr. 9, 1946 |
| 2,407,097 | Porter | Sept. 3, 1946 |
| 2,499,775 | Piganeau | Mar. 7, 1950 |